United States Patent [19]

Fink et al.

[11] Patent Number: 4,923,047
[45] Date of Patent: May 8, 1990

[54] MACHINE WITH VARIABLE TORQUE SETTING

[75] Inventors: Manfred Fink, Eberstadt; Wolfgang Schreiber; Manfred Ludwig, both of Stuttgart; Ewald Hald, Filderstadt; Guenter Kloss, Stuttgart, all of Fed. Rep. of Germany

[73] Assignee: C. & E. Fein GmbH & Co., Fed. Rep. of Germany

[21] Appl. No.: 285,744

[22] Filed: Dec. 15, 1988

[30] Foreign Application Priority Data

Dec. 18, 1987 [DE] Fed. Rep. of Germany ....... 3742952

[51] Int. Cl.$^5$ .............................................. F16D 49/00
[52] U.S. Cl. ......................................... 192/150; 81/477
[58] Field of Search .................. 192/150; 81/467, 469, 81/477

[56] References Cited

U.S. PATENT DOCUMENTS

| | | | |
|---|---|---|---|
| 3,215,921 | 11/1965 | Smith et al. | 192/150 |
| 3,515,255 | 6/1970 | States | 192/150 |
| 3,643,501 | 2/1972 | Pauley | 73/133 |
| 4,243,129 | 1/1981 | Schoeps | 192/150 |
| 4,502,549 | 3/1985 | Hornung et al. | 81/477 |
| 4,758,754 | 7/1988 | Fink et al. | 310/78 |
| 4,774,864 | 10/1988 | Dossier | 81/477 |

FOREIGN PATENT DOCUMENTS

| | | |
|---|---|---|
| 0182986 | 6/1986 | European Pat. Off. . |
| 0239670 | 10/1987 | European Pat. Off. . |
| 2629484 | 2/1977 | Fed. Rep. of Germany . |
| 3010019 | 5/1982 | Fed. Rep. of Germany . |
| 2829291 | 12/1982 | Fed. Rep. of Germany . |
| 2731090 | 9/1983 | Fed. Rep. of Germany . |

OTHER PUBLICATIONS

IBM Technical Disclosure Bulletin, vol. 27, No. 10A, Mar. 1985.

Primary Examiner—Rodney H. Bonck
Assistant Examiner—Nicholas Whitelaw
Attorney, Agent, or Firm—Kramer, Brufsky & Cifelli

[57] ABSTRACT

A motor-driven machine with variable torque setting includes a motor, a planetary gearing driving a work spindle and a rotatably mounted internal gear actuating a motor de-energizer against the action of a spring force when a settable limit torque is exceeded. To achieve a compact design, a torsion spring element extending in the axial direction alongside the planetary gearing is provided for generating the spring force. The torsion spring element carries a swivel element at one end which engages a cam on the internal gear and is held at an opposite end in a support so that the swivel element can swivel out of an initial position against the action of the force of the torsion spring element to de-energize the motor.

23 Claims, 5 Drawing Sheets

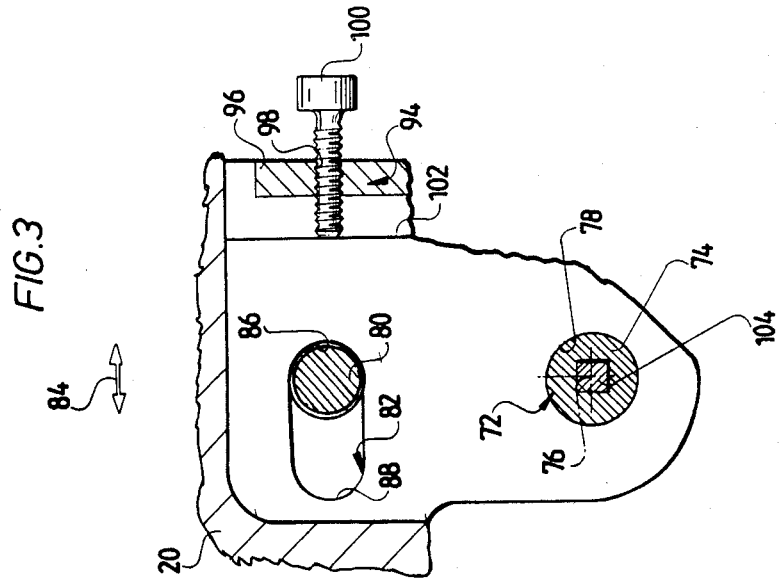
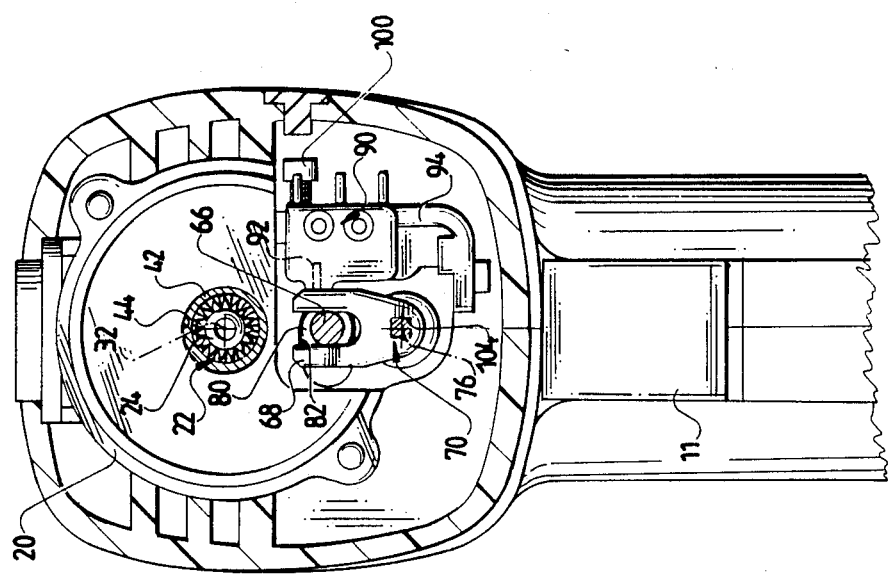

MACHINE WITH VARIABLE TORQUE SETTING

BACKGROUND OF THE INVENTION

1. Field of the Invention

The invention relates to a motor-driven machine with variable torque setting, in particular, a portable electric tool, comprising a motor and a planetary gearing driving a work spindle and including a rotatably mounted internal gear actuating a motor de-energizer against the action of a spring force when a settable limit torque is exceeded.

2. Description of the Related Art

Such motor-driven machines are known from German Patent 2 829 291. In the apparatus disclosed in this publication, the internal gear is provided on its end face with a cam element which rests against a ball which is spring-loaded in the direction of the end face of this internal gear. Once the opposing torque acting on the internal gear exceeds a certain limit value, the ball is displaced in the axial direction by the cam element and the motor de-energizer is actuated through this axial motion, which results in the motor being de-energized and hence the drive of the work spindle interrupted.

The above-described construction has the disadvantage that exact setting of the limit torque is not possible by the helical spring used therein. Also, the helical spring has the disadvantage that it does not permit a space-saving and compact apparatus design.

The object underlying the invention is, therefore, to so improve a machine with variable torque setting of the generic kind that it enables torque setting which is as precise as possible and a design which is as compact as possible.

This object is achieved, in accordance with the invention, in a motor-driven machine with variable torque setting of the kind described at the beginning by a torsion spring element extending in the axial direction along-side the planetary gearing being provided for generatin the spring force, the torsion spring element carrying at one end thereof a swivel element which engages a cam on the internal gear and being held at an opposite end in a support, by the swivel element being able to swivel out of an initial position against the action of the force of the torsion spring element, and by the motor de-energizer being thereby actuatable.

The great advantage of the invention solution is, above all, to be seen in the fact that a torsion spring element is used instead of a helical spring and that this torsion spring element extends longitudinally along an outer side of the planetary gearing and can thereby be implemented in a length which is adequate for a torque disconnection setting which is as exact as possible, without considerable additional space being required.

Use of a torsion element in connection with a gearing with a common countershaft is in fact known from German Offenlegungsschrift (unexamined Patent Application) 3 610 820 but in this apparatus the torsion element is arranged in front of the gearing parallel to the work spindle and, therefore, requires considerable additional space, which excludes a compact design.

SUMMARY OF THE INVENTION

When a torsion spring element is used, it is, in principle, possible not to prestress it in the initial position and so an increasing opposing torque also results in an increasing rotation of the swivel element. However, in order to achieve de-energization of the motor which is as defined as possible, it has proven expedient for the torsion spring element to be prestressed in a direction moving the swivel element into its initial position.

Since, in particular, also the swivel element requires a a lot of space on account of the necessary lever between the torsion element and engagement of the cam, it is expedient for the swivel element to be arranged on one side of the planetary gearing. This may be both the input side and the output side. In a preferred embodiment, however, the swivel element is arranged on the input side of the planetary gearing.

For an additional saving in space, it has proven expedient for the swivel element to engage over an end face of the planetary gearing so the swivel element does not require any additional space beyond the circumference of the planetary gearing.

In particular, when the swivel element is arranged on the input side, it is expedient for it to engage a space between the motor and the planetary gearing and thereby make optimum use of this space which is provided in any case.

Further savings in space are possible by the motor de-energizer likewise being arranged in the region of the space, preferably in the space itself.

Supplementarily to the arrangement of the swivel element, it is similarly expedient for the cam to also be arranged on an end face of the planetary gearing, and it is preferably the end face that faces the motor which is chosen for this purpose.

In the case of the known torque disconnection described at the beginning, the motor de-energizer is arranged so as to be acted upon by the axially displaceable element. This has the disadvantage that, in particular, upon a sudden increase in the torque, the axially displaceable part is very strongly accelerated and hence the motor de-energizer very rapidly actuated and since this part requires a larger braking distance than in the case of a slow increase in the opposing torque, this may result in the motor de-energizer being damaged by the accelerated part striking it. For this reason, it has proven advantageous for the swivel element to act upon the motor de-energizer in the initial position and for the motor de-energizer to switch off the motor in its position in which it is not acted upon. In this case, the motor de-energizer cannot be damaged by the accelerated swivel element because the swivel element moves away from the motor de-energizer during the acceleration and the switching-off is carried out by the motor de-energizer not being actuated.

To enable precise adjustment of the motor de-energizer and hence exact preselection and presetting of the switching-off point, it has proven expedient for the motor de-energizer to be advanceable in the direction towards the initial position of the swivel element.

In an embodiment of the swivel element, the latter comprises a switching fork which receives the cam.

In a preferred embodiment of the machine according to the invention, the internal gear is rotatable through a limited swivel angle. This embodiment has the great advantage that, for example, during the screwing operation, it enables tightening of the screw under so-called hard screwing conditions, i.e., when there is a sudden increase in the opposing torque, with a torque which exceeds the torque which can be applied by the inventive machine during normal operation. This is due to the fact that rotation of the internal gear is stopped by the limited swivel angle and the angular momentum present in the entire drive system can be used to finally drive the screw home. On the other hand, this device operates under soft screwing conditions, i.e., when the opposing torque increases slowly, in such a way that it switches off when the maximum torque is reached.

In an embodiment of the inventive solution as an alternative to the above-described version, the internal gear is rotatable through a full rotation and the swivel element has a stop arm which protrudes into a path of rotation of the cam. Hence, in this embodiment, it is possible for the cam to move over the stop arm and the residual angular momentum contained in the entire drive, therefore, "peters out" during rotation of the internal gear.

In such an embodiment, the stop is preferably designed so as to have an abutting surface which is inclined at an acute angle with respect to a sheaf of planes extending through the axis of rotation of the internal gear. An abutting surface of such shape has the advantage that it moves the stop arm only at a very large torque, but then very rapidly out of the path of rotation of the cam and thereby enables very rapid response of the motor de-energizer.

In the embodiments of the inventive machine with variable torque setting described so far, nothing has been said about how the support of the torsion element is to be arranged. In keeping with the arrangement of the swivel element, it has proven expedient from a space-saving point of view for the support to be arranged on a side of the planetary gearing opposite the swivel element. Accordingly, if the swivel element is to be arranged on the input side, the support is then preferably arranged on the output side.

To enable variable prestressing of the torsion element for the purpose of variable torque setting, it is advantageous for an adjusting device arranged on the output side of the planetary gearing to be provided for the support and for the prestressing of the torsion element to be regulated by the adjusting device through the support.

In a further development of this solution, provision is, therefore, made for the adjusting device to comprise a lever which accommodates the torsion element as support in a rotationally fixed manner and which is rotatably mounted coaxially with the torsion rod. With its free end, the lever rests on a link of a setting member and so by movement of the link of the setting member relative to the free end of the lever, the latter can be rotated into different positions and hence the torsion element prestressed to different degrees.

With regard to the arrangement of the setting member itself, it is advantageous for it to be rotatably arranged coaxially with the work spindle, thereby to enable adjustment as simply as possible.

The setting member is expediently designed as sleeve and mounted on a cylindrical extension of a gear housing.

To enable different settings of the setting member to be fixed, it has proven expedient for the cylindrical extension to be provided in its circumferential surface with grooves which extend in the axial direction thereof and in which detent noses of the setting member engage so that the setting member can be fixed at different rotary settings.

More particularly, this fixing can be free from play by providing on the setting member two detent noses one of which is slightly offset in relation to the groove corresponding to it so that the thus arranged detent noses enable slightly tensioned fixing of the setting member in the grooves.

For reasons of operational safety, it is very advantageous in all of the above embodiments for the torsion spring element to be prestressed in a direction moving the swivel element into its initial position.

BRIEF DESCRIPTION OF THE DRAWING

Further features and advantages are the subject of the following description and the appended drawings of several embodiments. The drawings show:

FIG. 2 a section along line 2—2 in FIG. 1;
FIG. 3 a section along line 3—3 in FIG. 1.

DESCRIPTION OF THE PREFERRED EMBODIMENTS

Figure 1:
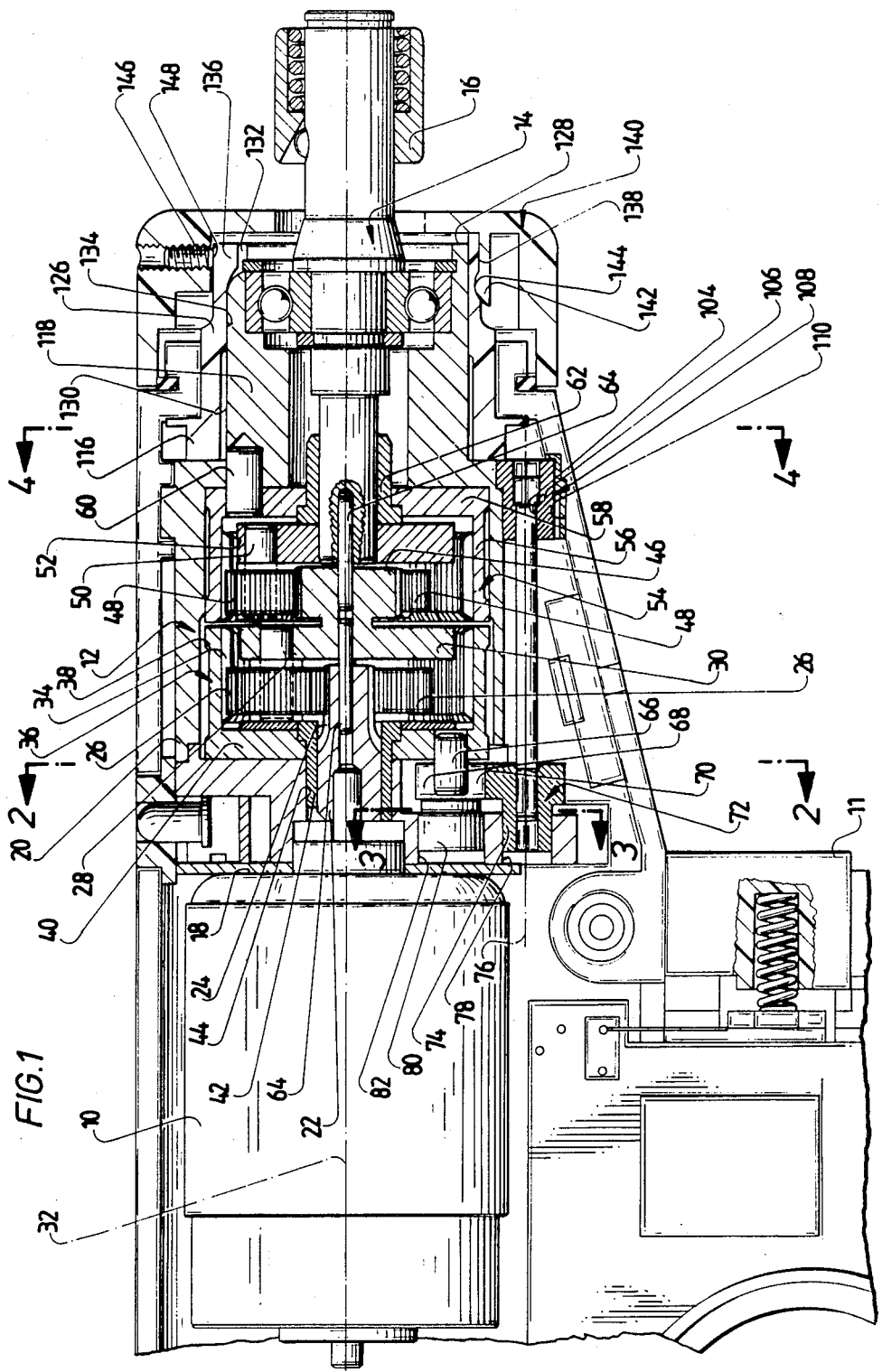
FIG. 1 a longitudinal section through a first embodiment of a torque screwdriver according to the invention.
Figure 4:
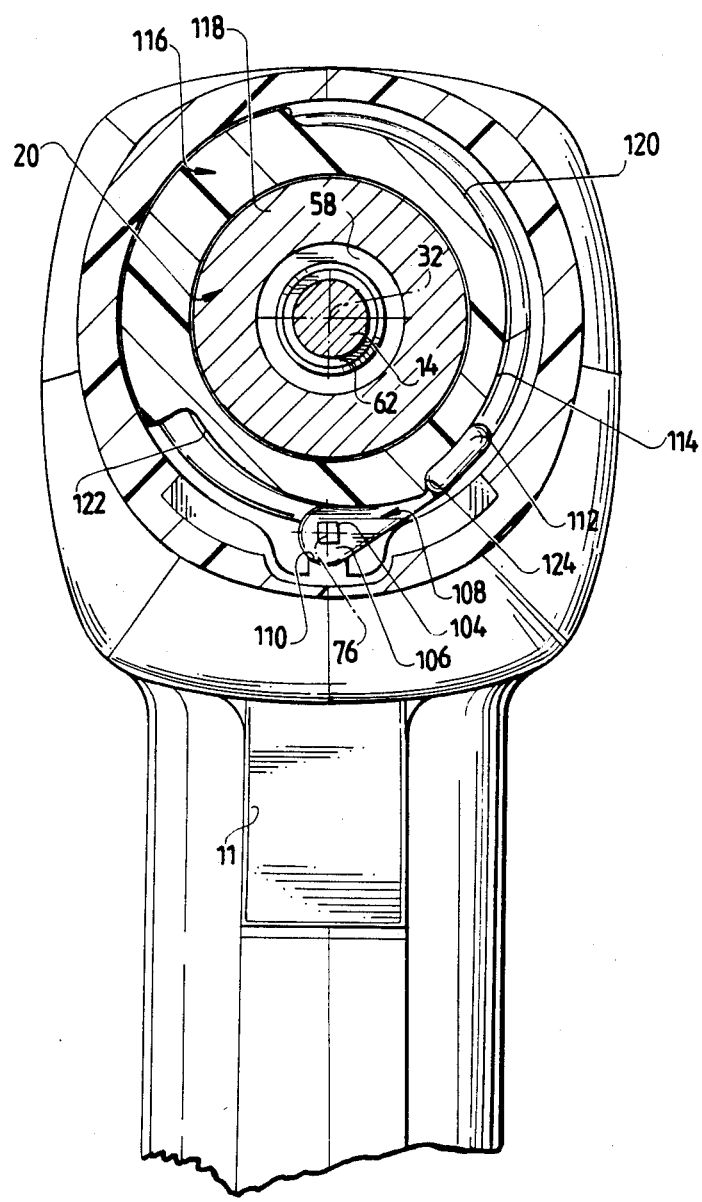
FIG. 4 a section along line 4—4 in FIG. 1.

An embodiment of the inventive machine with variable torque setting, in this case a torque screwdriver, illustrated in FIG. 1, comprises a motor 10 which can be switched on by a push-button switch 11. The motor 10 drives a planetary gearing desginated in its entirety 12 and through the latter a drive shaft 14 acting as work spindle and having, for example, a screwdriver head 16 held on it.

The motor 10 is held at its end face 18 on a gear housing designated in its entirety 20 which accommodates the planetary gearing 12. A motor shaft 22 extends away from this end face of the motor 10 into the planetary gearing 12 and a motor pinion 24 is formed on the end of the motor shaft facing away from the motor 10. This motor pinion 24 acts as sun wheel of a first gear stage and drives planet wheels 26 which are arranged around it and are rotatably mounted on bearing pins 28 of a planet carrier designated in its entirety 30 which extend coaxially with the motor shaft 22. The planet carrier 30 is arranged coaxially with an axis of rotation 32 of the motor shaft 22.

On the one hand, the planet wheels 26 engage with their toothing the motor pinion 24 and, on the other hand, they are supported in an internal toothing 34 of a first internal gear designated in its entirety 36. The first internal gear 36 comprises an internal gear cylinder 38 which carries the internal toothing 34 as well as an internal gear plate 40 which is formed on the internal gear cylinder 38. This internal gear plate 40 is arranged on the side of the planet wheels 26 facing the motor 10, extends in a plane which is perpendicular to the axis of rotation 32 and is held by a bushing 42 which is arranged coaxially therewith and with the axis of rotation 32. This bushing extends from the internal gear plate 40 in the direction of the motor 10 and engages a bearing bore 44 of the gear housing 20 surrounding the motor shaft 22 in a region located between the motor pinion 24 and the motor 10 so that the bushing 42 encloses the motor shaft 22 and is rotatably mounted in the bearing bore 44 of the gear housing 20 surrounding the motor shaft 22.

Hence also the first internal gear 36 including this bushing 42 is in all rotatably mounted in the gear housing 20. The motor pinion 24, the planet wheels 26, the planet carrier 30 and the first internal gear 36 constitute the first gear stage of the planetary gearing 12. In principle, a torque screwdriver according to the invention could be constructed with a single gear stage.

A second gear stage is merely included to enable the planetary gearing 12 to be provided in a simple manner with different transmission ratios.

A drive pinion 46 for driving the second gear stage is formed on the planet carrier 30 on the side opposite the motor 10 and is likewise driven coaxially with the axis of rotation 32. Again, planet wheels 48 are arranged around this drive pinion 46. The planet wheels 48 are likewise rotatably held on bearing pins 50 of a second planet carrier 52 which, in turn, is arranged coaxially with the axis of rotation 32 and is rotationally fixedly connected to the drive shaft 14. The planet wheels 48 engage with their toothing, on the one hand, the drive pinion 46 and, on the other hand, an internal toothing of a second internal gear 54 which likewise comprises an internal gear cylinder 56 as well as an internal gear plate 58 formed on the latter. However, this internal gear plate is arranged on the side of the second gear stage facing away from the motor 10, is rotationally fixedly held by an anchoring pin 60 in the gear housing 20 and is additionally supported by a bearing bush 62 on the drive shaft 14.

In order to fix both the motor shaft 22 and the planet carrier 30 with the drive pinion 46 as well as the drive shaft 14 in alignment and coaxially with the motor 10, the motor pinion 24, the planet carrier 30 with its drive pinion 46 and the drive shaft 14 are provided on their side facing the drive pinion 46 with coaxial bores in which centering pins 64 are rotatably inserted.

As stated above, the first internal gear 36 is rotatable about the axis of rotation 32 in the gear housing 20. Such rotation occurs in the direction opposite to the direction of rotation of the planet carrier 30. This rotatability of the first internal gear 36 is used to register the opposing torque occurring at the drive shaft 14 during the screwing operation. For this purpose, a switching pin 66 is provided on the internal gear plate 40 of the first internal gear 36 at a distance from the axis of rotation 32 and in parallel alignment with the latter. The switching pin 66 is seated in a bore cut to accurate size in the internal gear plate 40 and extends away from the latter in the direction of the motor 10. As shown in FIG. 2, this switching pin 66 engages between two legs 68 of a switching fork 70. This switching fork is part of a swivel lever designated in its entirety 72 which with a cylindrical bearing body 74 whose cylinder axis 76 is in parallel alignment with the axis of rotation 32 is held in a bearing bore 78 for rotation about its cylinder axis 76. The cylinder axis 76 is so arranged that radially it extends at the outside in relation to the planetary gearing 12 and parallel to the axis of rotation 32. The swivel lever 72 then extends in a space between the end face 18 of the motor 10 and the internal gear plate 40 of the planetary gearing 12 in the direction towards the axis of rotation 32.

As shown in FIG. 3, an extension 80 oriented approximately parallel to the axis of rotation 32 is formed on the side of the switching fork 70 facing the end face 18 of the motor 10. The extension 80 engages an oval recess 82 in the gear housing 20 which is aligned with its longitudinal axis so as to permit swivel motion of the swivel lever 72 about the axis of rotation 76 through a certain swivel angle which is preferably of the order of magnitude of approximately 10 degrees. Wall surfaces 86 and 88 of the oval recess 82 which extend perpendicularly to the swivel direction 84 define extreme positions of the swivel lever 72. In the embodiment shown in FIGS. 2 and 3, the wall surface 86 defines an initial position of the swivel lever 72 by the extension 80 resting against it, while the wall surface 88 then defines the maximum swivel position.

A motor de-energizer 90 is arranged in the space between the end face 18 of the motor 10 and the internal gear plate 40 of the first internal gear 36. With a feeler 92, the motor de-energizer 90 detects the different positions of the switching fork 70. This motor de-energizer 90 is held on an angle-shaped carrier bracket 94 such that its feeler 92—as shown in FIG. 2—cooperates with the right leg 68 of the switching fork 70 and is actuated when the swivel lever 72 and hence the switching fork 70 are in their initial position. When the feeler 92 is in this actuated position, the motor de-energizer permits the motor 10 to be switched on. If, however, the swivel lever 72 and hence the switching fork 70 swivel from the initial position in which the extension 80 rests against the wall surface 86 of the oval recess 82 in the direction of the maximum swivel position in which the extension 80 rests against the wall surface 88 of the oval recess 82, the right leg 68 of the switching fork 70 then no longer actuates the feeler 92 and the motor de-energizer 98 switches the motor 10 off.

To enable the motor de-energizer 90 which, more particularly, is designed as a microswitch with as short a switching path of the feeler 92 as possible, to be placed in its position relative to the right leg 68 of the switching fork 70, the carrier bracket 94 has a threaded bore 98 in the region of its free end 96. A screw 100 inserted in the threaded bore 98 extends in a direction which is perpendicular to the axis of rotation 32 and approximately parallel to the swivel direction 84 of the swivel lever 72 towards a supporting surface 102 on the gear housing 20 and rests thereon. Hence increased tightening of the screw 100 causes the carrier bracket 94 to be bent with its end 96 away from the supporting surface 102 or vice versa and so the spring action of the carrier bracket 94 serves in conjunction with the screw 100 to finely adjust the motor de-energizer 90 relative to the right leg 68 of the switching fork 70.

In order that rotation of the first internal gear 36 will only occur from a certain settable torque onwards, there is rotationally fixedly inserted in the swivel lever 72, in particular, its bearing body 74, a torsion rod 104 which extends coaxially with the axis of rotation 76 along the planetary gearing 12 to a cylindrical bearing head 106 of a prestress lever 108 which is rotatably arranged on the output side of the planetary gearing 12 approximately at the level of the internal gear plate 58 in a bearing bore 110 of the gear housing 20 accommodating the bearing head 106.

The prestress lever 108 extends in a plane which is perpendicular to the axis of rotation 32 and the axis of rotation 76 and comprises a sliding piece 112 at its fornt end opposed to the bearing head 106. The sliding piece 112 extends from the prestress lever 100 in the direction towards the screwdriver head 16.

This sliding piece 112 rests on a prestress link 114 of a link ring 116 which is rotatably mounted coaxially with the axis of rotation 32 on a cylindrical extension 118 of the gear housing 20 extending from the planetary gearing 12 in the direction towards the screwdriver head 16. The prestress link 114 comprises a surface on which the sliding piece 112 of the prestress lever 108 rests. This surface extends in the direction of the axis of rotation 32 parallel thereto, but eccentrically in relation to the axis of rotation 32. Hence by turning the link ring 116 through a certain maximum rotary angle, the sliding piece 112 is transferable from a shorter radial spacing from the axis of rotation 32 to a larger radial spacing —and vice versa—, which results in swivelling of the prestress lever 108 and, consequently, turning of the torsion rod 104. The torsion rod 104 is thereby turned in such a way that it prestresses the swivel lever 72 in the direction of its initial position and so the extension 80 rests against the wall surface 86 when the torque screwdriver is in the operating mode which is free from opposing torque.

The eccentric surface 120 is of such design that its minimum radial spacing from the axis of rotation 32 already causes a basic prestressing of the torsion rod 104 through the prestress lever 108.

In this state, assembly of the link ring would be problematic and, therefore, an assembly link 122 adjoining the link 114 is provided on the link ring 116. The assembly link 122 has a minimum radial spacing from the axis of rotation 32 corresponding to a position of the sliding piece in which it is free from prestress and extends as far as a maximum radial spacing from which it passes through a step 124 into the link 114. Hence during assembly, the link ring may be positioned in such a way that the sliding piece lies in the region of the minimum radial spacing of the assembly link. By simply turning the link ring 114, the sliding piece 112 can then be moved over the step 124 into the region of the prestress link 114. By means of the step 124 which has a decreasing radial spacing from the axis of rotation 32 from the assembly link 122 to the prestress link 114, turning back of the link ring 116 such that the sliding piece 112 comes to rest in the region of the assembly link 122 again is impossible.

An adjusting sleeve 126 is formed on the link ring 116 for adjustment thereof. The adjusting sleeve 126 extends from the link ring 116 in the direction of the screwdriver head 16 and engages over the entire cylindrical extension 118 of the gear housing 20 up to its end face 128. To enable this adjusting sleeve 126 to be fixed on the cylindrical extension 118 in various rotary angular positions in relation thereto, the cylindrical extension 118 is provided with circumferential grooves 132 on its circumferential surface 130 which extend from the end face 128 in the direction of the motor 10 parallel to the axis of rotation 32. Detent noses 136 arranged on an inside surface 134 of the adjusting sleeve facing the circumferential surface 130 resiliently engage these circumferential grooves 132. The detent noses are preferably integrally formed on the adjusting sleeve 126, which, in turn, is made of elastic material.

The circumferential grooves 132 are expediently distributed over the entire circumferential surface 130 in the region adjacent to the end face 128, while two oppositely located detent noses 136 are preferably arranged in slightly offset relation to each other so as to lock the adjusting sleeve 126 without play in the circumferential grooves 132.

Turning of the adjusting sleeve 126 is carried out by a switching ring 140 which engages over the adjusting sleeve 126 in its front region facing the screwdriver head 16 on an outer surface 138. With detent members 142, the switching ring 140 engages corresponding recesses 144 in the outer surface 138 of the adjusting sleeve 126 and is thereby rotationally fixedly connected to the adjusting sleeve 126. The switching ring 140 preferably also engages over the end face 128 of the cylindrical extension 118 as far as the drive shaft 14.

To enable additional fixing of a rotational position of the adjusting sleeve 126 relative to the cylindrical extension 118, an adjusting screw 146 extending radially from the outside through the switching ring is screwed into the latter. With its front surface 148, the adjusting screw 146 can press against the outer surface 138 of the adjusting sleeve 126 in the region of its detent noses 136 and so the detent noses 136 are no longer able to move resiliently out of the circumferential grooves 132 but are fixed therein. Hence rotation of the adjusting sleeve 126 is impossible.

The first embodiment according to the invention operates as follows:

The prestressing of the torsion bar 104 whereby the switching fork 70 is held in its initial position is so selected that during the normal screwing-in of a screw with the screwdriver head 16, the first internal gear 36 with the switching pin 66 is held in a rotationally fixed manner by the switching fork 70, i.e., the opposing torque acting on the first internal gear 36 is not able to swivel the switching fork 70 out of its initial position in which the extension 80 rests against the wall surface 86 of the oval recess 82.

Once the screw has been screwed in, the opposing torque acting on the first internal gear 36 increases, which results in the switching pin 66 swivelling the switching fork 70 out of its initial position, whereby the feeler 92 is released and causes the power supply to the electric motor 10 to be interrupted through the motor de-energizer 90. The switching fork 70 can thereby be swivelled out to the extent that the extension 80 rests against the wall surface 88 of the oval recess 82 defining the maximum swivel position. In this swivel position, further rotation of the first internal gear 36 is no longer possible because the switching pin 66 cannot swivel the switching fork 70 any further. The angular momentum still present in the entire gear system in this state can, therefore, be used for additional tightening of the screw.

Such additional tightening is carried out particularly under so-called hard screwing conditions where the opposing torque acting on the drive shaft 14 and hence also on the first internal gear 36 increases abruptly and so the switching fork 70 very quickly reaches the maximum swivel position 88 in which it stops the rotation of the first internal gear 36 and hence the dropping of the angular momentum present in the entire drive system comprising motor 10, gearing 12 and drive shaft 14 so that this so-called residual angular momentum is still able to tighten the screw with a torque which exceeds the maximum torque to be applied by the entire drive system under normal conditions.

In contrast, under soft screwing conditions the apparatus according to the invention operates in such a way that the opposing torque rises very slowly and so the switching fork 70 is slowly swivelled by the switching pin 66, as a result of which there remains between the switching-off of the motor 10 and the reaching of the maximum swivel position of the switching fork a time interval in which the entire drive system can come to a standstill and so under soft screwing conditions the torque with which the screw is finally tightened corresponds to the torque to be applied by the entire drive system.

In order to vary this maximum torque, the switching ring 140 is turned, which causes the link ring 116 to also be turned and hence the prestressing of the torsion rod 104 to be varied by means of the different radial spacing of the sliding piece 112 from the axis of rotation 32 and so response of the torque disconnection can be set at different opposing torques.

Figure 5:
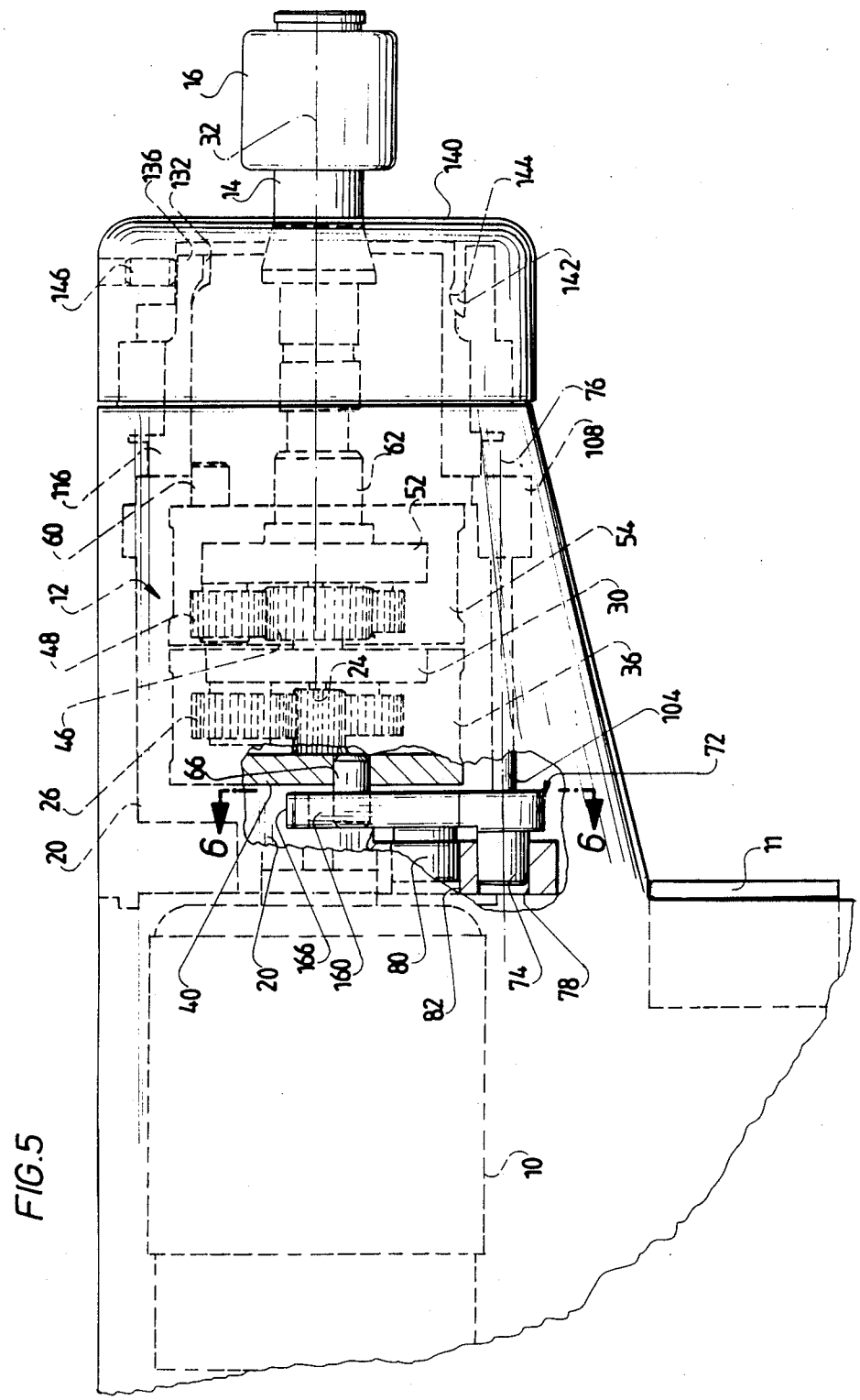
FIG. 5 a partial longitudinal section similar to FIG. 1 of a second embodiment.
Figure 6:
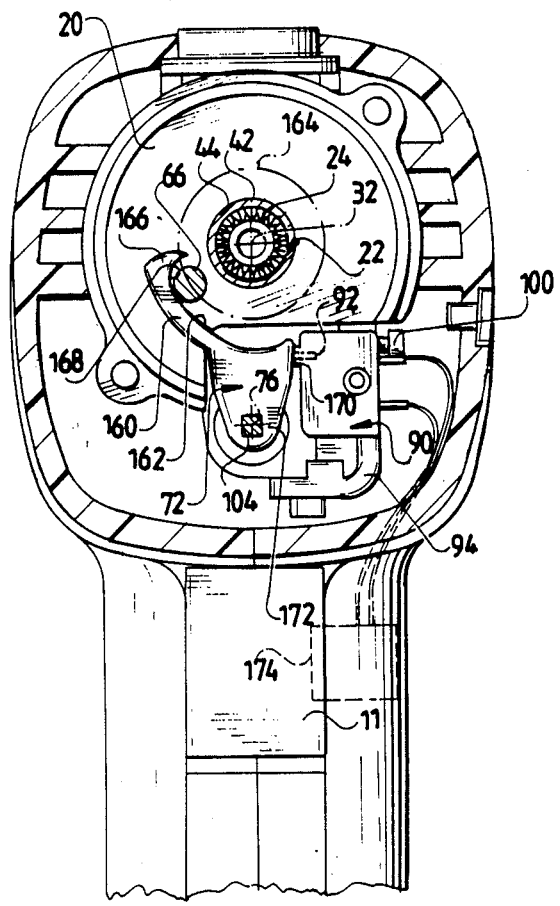
FIG. 6 a section along line 6—6 in FIG. 5.

In a second embodiment, illustrated in FIGS. 5 and 6, the arrangement of the motor 10, the planetary gearing 12 and the drive shaft 14 relative to one another and their special design are identical with those of the first embodiment illustrated in FIGS. 1 to 3. Insofar as the same parts are used, these also bear the same reference numerals as in the first embodiment and so reference is made in this connection to the description of the first embodiment.

In contrast with the first embodiment, the swivel lever 72 is not provided with an switching fork 70 but with an approximately sickel-shaped lever arm 160 which is of such design that its inner side 162 facing the axis of rotation 32 enables the switching pin 66 to rotate on a closed path 164 about the axis of rotation 32. A nose 166 which extends into the path of rotation 164 is arranged at one end of this lever arm 160. The nose 166 prevents free rotation of the switching pin 66 on the path of rotation 164 and comprises an abutting surface 168 whose radial spacing from the axis of rotation 32 decreases progressively from the inner side 162 of the lever arm and against which the switching pin 66 rests when the swivel lever 72 is in the initial position.

The swivel lever 72 is additionally provided with the extension 80 which, in the initial position, rests against the wall surface 86 of the oval recess 82. However, the oval recess is enlarged in the swivel direction 84 of the swivel lever 72 about its axis of rotation 76 such that the lever arm 160 can swivel until the switching pin 66 has moved the nose 166 out of its path of rotation 164 and slides over the nose 166. Hence no limitation of the maximum swivel position by the wall surface 88 of the oval recess is necessary.

Similarly, the motor de-energizer 90 is arranged such that it rests with its feeler 92 against the right side surface 170 of a base portion 172 of the swivel lever 72 as viewed in FIG. 6.

The second embodiment operates as follows:

Once the opposing torque at the drive shaft 14 increases the switching pin 66 will press with increasing force against the abutting surface 168 and hence move the nose 166 together with the lever arm 160 radially outwardly out of the path of rotation 164. The abutting surface 168 is preferably designed such that increasing swivel motion of the nose 166 out of the path of rotation 164 requires an increasingly larger opposing torque. Once the opposing torque is so large that the switching pin 66 has moved the nose 166 completely out of the path of rotation 164 and has slid over the nose 166, the first internal gear 36 in its entirety can then carry out one rotation during which the switching pin 66 rotates on the path of rotation 164. Meanwhile, the lever arm 160 with the nose 166 has swivelled back in the radial direction towards the axis of rotation 32 so the nose 166 protrudes into the path of rotation 164 again and prevents further motion of the switching pin 66 thereon.

This outward swivelling of the nose 166 out of the path of rotation 164 has caused the right side surface 170 of the base portion 172 to move away from the motor de-energizer 90 and hence to release the feeler 92. A trigger pulse which causes the motor 10 to be switched off is thereby generated. A control means 174 which reacts to this trigger pulse and switches off the motor 10 is required for this purpose because the swivel lever 72 swivels back into its initial position again and acts upon the feeler 92 of the switch 90 after the switching pin 66 has passed the nose 166, which without an additional control means 174 would start the motor 10 again. This is not desired, but what is required is that the motor 10 should remain switched off after the motor switch 90 has issued a trigger pulse until the next screwing operation, i.e., until the next switching-on of the motor 10 by the manually operated switch 11.

The setting of the different response torque, i.e., the different prestressing of the torsion bar 104 is carried out with the same devices and in the same way as in the first embodiment. Therefore, reference is made to the statements on the first embodiment for a description of this setting.

The present disclosure relates to the subject matter disclosed in German Application No. P 37 42 952.3 of December 18, 1987, the entire specification of which is incorporated herein by reference.

We claim:

1. A motor-driven machine with a variable torque setting, in particular, a portable electric tool, comprising:

a housing, a motor within said housing, a planetary gearing extending in an axial direction and driving a work spindle, said planetary gearing including an internal gear rotatably mounted in said housing and actuating a motor de-energizer against the action of a spring force when a settable limit torque is exceeded, a torsion spring element extending in said axial direction alongside and sideways of said planetary gearing for generating said spring force, said torsion spring element carrying at one end thereof a swivel element which engages a cam on said internal gear and being held at an opposite end in a support, said swivel element being able to swivel out of an initial position against the action of the force of said torsion spring element, for actuating said motor de-energizer thereby.

2. Motor-driven machine as defined in claim 1, characterized in that said torsion spring element (104) is prestressed in a direction moving said swivel element (72) into its initial position.

3. Motor-driven machine as defined in claim 1, characterized in that said swivel element (72) is arranged on one side of said planetary gearing (12).

4. Motor-driven machine as defined in claim 3, characterized in that said swivel element (72) is arranged on the input side of said planetary gearing (12).

5. Motor-driven machine as defined in claim 3, characterized in that said swivel element (72) engages over an end face of said planetary gearing (12).

6. Motor-driven machine as defined in claim 3, characterized in that said swivel element (72) engages a space between said motor (10) and said planetary gearing (12).

7. Motor-driven machine as defined in claim 1, characterized in that said motor de-energizer (90) is arranged in the region of said space.

8. Motor-driven machine as defined in claim 1, characterized in that said cam is arranged on an end face of said planetary gearing (12).

9. Motor-driven machine as defined in claim 1, characterized in that in the initial position, said swivel element (72) acts upon said motor de-energizer (90), and in that in its position in which it is not acted upon, said motor de-energizer (90) switches off said motor (10).

10. Motor-driven machine as defined in claim 9, characterized in that said motor de-energizer (90) is advanceable in the direction towards the initial position of said swivel element (72).

11. Motor-driven machine as defined in claim 1, characterized in that said swivel element (72) comprises a switching fork (70) which receives said cam.

12. Motor-driven machine as defined in claim 1, characterized in that said internal gear (36) is rotatable through a limited swivel angle.

13. Motor-driven machine as defined in claim 1, characterized in that said internal gear (36) is rotatable through a full rotation, and in that said swivel element (72) comprises a stop arm (160, 166) which extends into a path of rotation (164) of said cam (66).

14. Motor-driven machine as defined in claim 13, characterized in that said stop arm (160, 166) comprises an abutting surface (168) inclined at an acute angle with respect to a sheaf of planes extending through the axis of rotation (32) of said internal gear (36).

15. Motor-driven machine as defined in claim 1, characterized in that the support (106) is arranged on a side of said planetary gearing (12) located opposite said swivel element (72).

16. Motor-driven machine as defined in claim 1, characterized in that an adjusting device (108, 116, 126, 140) arranged on the output side of said planetary gearing (12) is provided for said support (106).

17. Motor-driven machine as defined in claim 16, characterized in that said adjusting device comprises a lever (106, 108) which receives said torsion element (104) as support in a rotationally fixed manner and is rotatably mounted coaxially with said torsion element, said lever resting with its free end (112) on a link (114) of a setting member (116).

18. Motor-driven machine as defined in claim 17, characterized in that said setting member (116) is rotatably arranged coaxially with said work spindle (14).

19. Motor-driven machine as defined in claim 18, characterized in that said setting member (116) is in the form of a sleeve and is mounted on a cylindrical extension (118) of a gear housing (20).

20. Motor-driven machine as defined in claim 19, characterized in that said cylindrical extension (118) has in its circumferential surface (130) grooves (132) which extend in the axial direction thereof and in which detent noses (136) of said setting member (116, 126) engage.

21. Motor-driven machine as defined in claim 20, characterized in that two detent noses (136) are provided on said setting member (116, 126), and in that one of these detent noses (136) is slightly offset in relation to the groove corresponding to it.

22. Motor-driven machine as defined in claim 1, characterized in that a control means (174) is provided and after said motor de-energizer (90) has been actuated once, said control means leaves said motor (10) switched off until it is switched on again at a manually operated switch (11).

23. A motor-driven machine with a variable torque setting, in particular, a portable electric tool, comprising:
   a housing,
   a motor within said housing,
   a planetary gearing extending in an axial direction and driving a work spindle, said planetary gearing including an internal gear rotatably mounted in said housing and actuating a motor de-energizer against the action of a spring force when a settable limit torque is exceeded,
   a torsion spring element extending in said axial direction alongside said planetary gearing and substantially intermediate said motor and said work spindle for generating said spring force,
   said torsion spring element carrying at one end thereof a swivel element which engages a cam on said internal gear and being held at an opposite end in a support, said swivel element being able to swivel out of an initial position against the action of the force of said torsion spring element, for actuating said motor de-energizer thereby.

* * * * *